United States Patent [19]
Fujii et al.

[11] 3,848,127
[45] Nov. 12, 1974

[54] X-RAY EXAMINATION SYSTEM FOR EXAMINING THE WELDED PORTIONS AT BOTH ENDS OF STEEL PIPES

[75] Inventors: Seiji Fujii; Kunio Matsui; Shigeru Sato, all of Fukuyama; Keijiro Ito, Osaka; Takashi Koizumi; Shozo Tsuboyama, both of Kyoto; Hiroyuki Watanabe, Otsu, all of Japan

[73] Assignees: Nippon Kokan Kabushiki Kaisha, Tokyo; Shimadzu Seisakusko Ltd., Kyoto-shi; Shimadzu Metal Industries Ltd., Otsu-shi, all of, Japan

[22] Filed: Sept. 25, 1973

[21] Appl. No.: 400,549

[52] U.S. Cl................. 250/321, 250/358, 250/445, 250/453, 250/490
[51] Int. Cl. .......................................... G01n 23/00
[58] Field of Search ........... 250/320, 321, 322, 323, 250/358, 359, 360, 439, 444, 445, 446, 453, 490, 491

[56] References Cited
UNITED STATES PATENTS
2,435,134  1/1948  Forssell.............................. 250/321
2,532,536  12/1950  Boucher............................. 250/321
3,119,019  1/1964  Henry, Jr. et al.................. 250/453

*Primary Examiner*—William F. Lindquist
*Attorney, Agent, or Firm*—Flynn & Frishauf

[57] ABSTRACT

An X-ray examination system for examining the welded portions at both ends of steel pipes which is characterized in that there are provided between two linearly arranged roller conveyor lines an X-ray examination chamber and a control chamber for controlling the travel of steel pipes and the setting of two X-ray penetration devices; a plurality of turning rollers are arranged along both roller conveyor lines to rotate steel pipes in the circumferential direction; the turning rollers closest to both crosswise sides of the X-ray examination chamber and each provided with an automatic welded seam detector including a microswitch so as to stop rotating steel pipes at a prescribed peripheral angle, whereby the welded portion of the forward end of either of two adjacent ones of a plurality of steel pipes successively carried on the roller conveyor lines and the welded portion of the rear end of the other of said two adjacent steel pipes are examined in the examination chamber by two X-ray penetration devices operated under the remote control effected in the control chamber.

4 Claims, 2 Drawing Figures

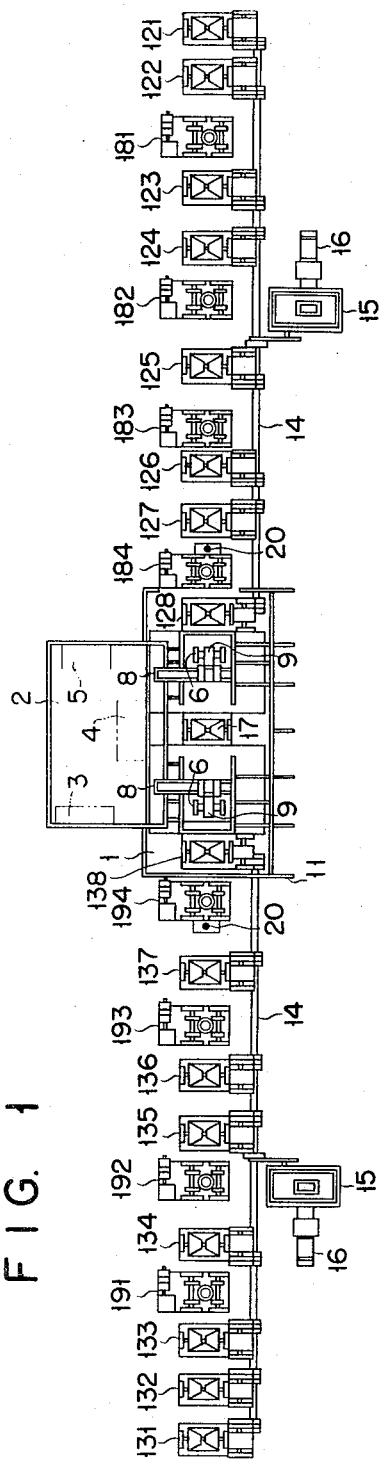
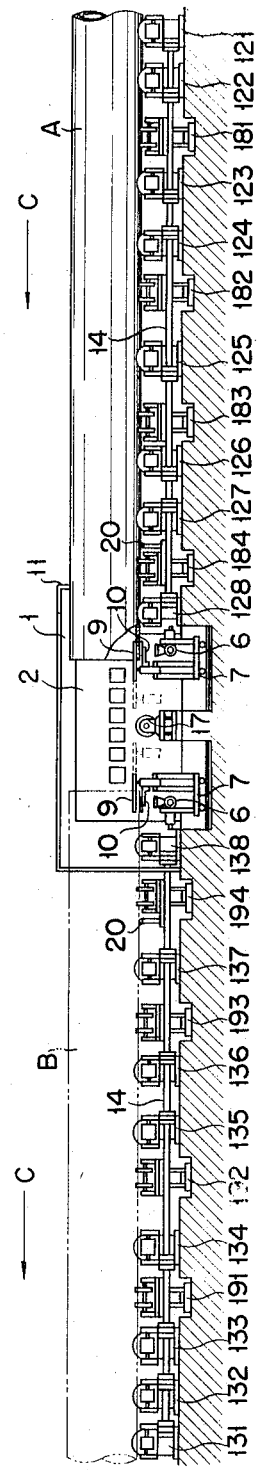
FIG. 1
FIG. 2

X-RAY EXAMINATION SYSTEM FOR EXAMINING THE WELDED PORTIONS AT BOTH ENDS OF STEEL PIPES

This invention relates to an X-ray examination system for examining by penetration of X-ray the welded portions at both ends of a steel pipe formed by rolling up an elongate steel plate into a cylindrical shape and welding together both abutting edges of said steel plate along its length.

X-ray examination of the welded portions at both ends of a steel pipe has already been practised in the past. In the conventional examination process, an operator fitted a required examining means, for example, an X-ray penetration device to each steel pipe being examined. Such practice consumed long hours of work and proved extremely inefficient in the case where examination was to be made of the welded portions of a large number of steel pipes. When the amount of examination increased, therefore, a larger number of operators had to be engaged in examining steel pipes in order to shorten the time of examination per operator, unavoidably leading to higher personnel cost. Moreover, an examiner who was obliged to operate an X-ray device by his own hands was always exposed to X-ray risk.

According to the X-ray examination system of this invention, welded steel pipes being examined are successively brought to an examination area in the examination chamber by a roller conveyor line at a prescribed interval. Provided in the examination area are an X-ray examination chamber protected by a shield and a control chamber for delivering a film and X-ray penetrameter to the examination chamber. In the control chamber, a single operator controls the feed and rotation of a steel pipe by operating the required control panels and fixes an X-ray penetration device to the end portion of a steel pipe. To rotate a steel pipe, a plurality of turning rollers are placed at a suitable point between the respective roller stands of the roller conveyor line. Further, an automatic welded seam detector is provided to stop a steel pipe rotated by the turning rollers after effecting said rotation through a proper peripheral angle to being the welded portion at the end of the rotated steel pipe to the point at which penetration of X-ray can be photographed. A second roller conveyor line is installed on the pipe-forwarding side of the examination chamber to deliver onward therethrough a pipe having the welded portion of its forward end already examined. When the greater part of the steel pipe has left the examination chamber, the welded portion of the rear end of the steel pipe is examined. To this end, a second X-ray penetration device is provided in the examination chamber. The second roller conveyor line is similarly equipped with another group of turning rollers and another automatic welded seam detector. While the welded portion of the rear end of the preceding steel pipe is examined, the welded portion of the forward end of the succeeding steel pipe is simultaneously examined by the first X-ray penetration device.

It is accordingly an object of this invention to provide an X-ray examination system for examining by X-ray penetration the welded portions of steel pipes which enables said examination to be carried out by a single or a very small number of operators, thus offering great economic advantage.

Another object of the invention is to provide an X-ray examining system for examining the welded portions of steel pipes which enables said examination to be undertaken with great safety without the necessity for an examiner to operate the X-ray penetration device by his own hands.

Further objects of the invention will be more fully understood by reference to the description of the preferred embodiment and appended drawing, in which:

FIG. 1 is a schematic plan view of the preferred embodiment of this invention; and FIG. 2 is a schematic front view of the preferred embodiment of the invention, with a steel pipe being examined indicated in solid lines.

The drawing presents the X-ray examining system of this invention, at the center of which there are provided an examination chamber 1 and a control chamber 2 annexed thereto. The control chamber 2 has a power distribution board 3, a control panel 4 for the feeding of a steel pipe and X-ray photographing and a control panel 5 for application of X-rays, all placed in the prescribed positions.

In the examination chamber 1, a pair of X-ray tubes 6, 6 are mounted on trucks 7, 7 movable within a fixed range. The upper surface of the truck 7 is fitted with parallel guide rails 8, 8 for guiding a film cassette carrier 9. The end of each guide rail 8 extends into the control chamber 2 from its front side. The film cassette carrier 9 is loaded with an X-ray photographing film. Penetrameter carriers placed 10 are carried on the trucks 7, 7. A penetrameter is placed on each of said carriers 10, 10. The film cassette carrier 9 can be transported from the control chamber 2 into the examination chamber 1 by means of the guide rails 8, 8. The X-ray penetration device comprises the X-ray tube 6, penetrameter carrier 10 bearing a penetrameter, film cassette carrier 9 loaded with a film and truck 7, so as to examine the welded portion at the end of a steel pipe. The X-ray penetration device is actuated by the control panels 4 and 5 disposed in the control chamber 2 when they are operated by an operator. Namely, said actuation is not effected by an operator's own hands as is the case with the prior art examination apparatus, but by remote control.

The examination chamber 1 is surrounded with a shield 11 so as to prevent the harmful effect of X-rays from being exerted to the outside of the examination chamber 1.

A first group of roller conveyor stands 121 to 128 and a second group of roller conveyor stands 131 to 138 are linearly arranged on both sides of the examination area in which the examination chamber 1 and control chamber 2 are installed. The first group of roller conveyor stands 121 to 128 collectively feeds a steel pipe to the examination chamber 1, and the second group of roller conveyor stands 131 to 138 sends forward an examined steel pipe from the examination chamber 1. In FIG. 2, two linearly arranged steel pipes A and B are shown in solid and chain-dot lines. The steel pipes A and B are transported in the direction of the indicated arrow C on the first and second roller conveyor lines at a prescribed interval by operation of the control panel 4 of the control chamber 2. Though only two steel pipes are shown in FIG. 2, it will be understood that in practice, a large number of steel pipes are successively carried on the roller conveyor lines.

Each conveyor roller stand of the roller conveyor line has two frustum shaped rollers facing each other at the truncated ends and designed to be rotated jointly by means of a rotary shaft. While the roller stands respectively have a sufficient mechanical strength to support a steel pipe traveling thereon, they are further spaced from each other at such an interval as is required to prevent the steel pipe from being flexed. The rollers are fitted to the elongate drive shafts 14, 14 included in the first and second roller conveyor lines so as to be jointly rotated by said drive shafts 14, 14. The drive shaft 14 is connected to a motor 16 through a reduction gear 15. The start and stop of the motor 16 and the drive of the reduction gear 15 are remotely controlled by operating the control panel 4 of the control chamber 2. Only the conveyor roller stands 128 and 138 of the first and second roller conveyor lines respectively are received in the examination chamber 1. Further, the examination chamber 1 has another conveyor roller stand 17 disposed at the center in alignment with both roller conveyor lines.

At a suitable point between the respective roller stands constituting two groups 121 to 128 and 131 to 138 of the first and second conveyor lines are provided two groups of turning roller stands 181 to 184 and 191 to 194 in alignment with said roller conveyor stands. The group of turning roller stands 181 to 184 are positioned on the steel pipe-feeding side of the subject X-ray examining system, and the group of turning roller stands 191 to 194 are arranged on the steel pipe-forwarding side of said system. The turning roller stands are designed to cause a steel pipe placed on each roller conveyor line to be lifted slightly above said line by the known means received in said turning roller stands so as to permit the circumferential rotation of the steel pipe. To effect said rotation, each turning roller stand contains, as shown in FIG. 1, a pair of support shafts spaced from each other at a prescribed interval and disposed parallel with the shaft of a steel pipe and wheels fixed to both ends of each of said support shafts. The wheels support the steel pipe and are rotated when the support shafts are driven by the motors fitted to the turning roller stands, thereby finally effecting the rotation of the steel pipe.

The start and reversible rotation of the motor is remotely controlled by operating the control panel 4 of the control chamber 2.

The turning roller stands 184 and 194 respectively closest to the steel pipe-feeding and -forwarding sides of the examination chamber 1 are provided with automatic devices 20, 20 for detecting the positions of welded seams of steel pipes mounted on the first and second roller conveyor lines. Before conducted to the X-ray examination system, a steel pipe is formed by rolling up an elongate steel plate into a cylindrical shape and welding both abutting edges along the length of said plate. Accordingly, the outer surface of a steel pipe brought to the examination system has a linear welded seam extending along the length of said pipe in a state raised from the surface of the steel pipe. The microswitch of the automatic welded seam detector 20 is normally made to contact the outer peripheral surface of a steel pipe mounted on the roller conveyor line. Even while the steel pipe is lifted or rotated by the turning roller stands, the microswitch of the welded seam detector 20 can be lifted together with the vertical movable part of said turning roller stand, thereby maintaining a perpetual contact with the peripheral surface of the steel pipe. When actuated upon contact with the welded portion of the steel pipe due to its rotation, the microswitch automatically stops the rotation of the turning roller assembly, thereby bringing the rotating steel pipe to rest at a prescribed peripheral angle.

There will now be described the operation of the X-ray examining system of this invention arranged as described above.

A welded steel pipe is conducted to the examining system from the right side of FIG. 2. Ahead of the time, a single operator in the control chamber 2 operates the control panel 4 to introduce power into the motor, whose drive is transmitted to the drive shaft 14, which in turn rotates the roller conveyor stands 121 to 128 arranged on the pipe-feeding side of the examination system.

The rotating roller conveyor stands 121 to 128 transport a steel pipe in the direction of the indicated arrow C. When the forward end of the steel pipe approaches the examination chamber 1, the reduction gear 15 is put into operation gradually to slow down the feed rate of the steel pipe. When, as shown in FIG. 2, the forward end of the steel pipe A indicated in solid lines reaches the examination position in the examination chamber 1, the pipe A is automatically brought to rest at that point.

Next, the turning roller assembly comprising stands 181 to 184 is driven by operation of the control panel 4 of the control chamber 2 to raise the steel pipe A to a prescribed height in a horizontal position. After once stopped at said height, the steel pipe A is slowly rotated in the circumferential direction by the wheels of the respective turning roller stands 181 to 184. The microswitch of the automatic welded seam detector 20 which is kept in contact with the peripheral surface of the steel plate A on the feeding side during the operation of the turning roller assembly begins to be actuated when touched by the welded portion of the rotating steel pipe A, thereby stopping it at that point. Thus the welded portion of the forward end of the steel pipe A is automatically brought to exactly to the point of examination.

The truck 7 of the examination chamber 1 still remains in an inoperative position shown in broken lines in FIG. 2. The film cassette carrier 9 loaded with a film by a single operator in the control chamber 2 is delivered to the examination chamber 1 by traveling on the guide rails 8 provided on the truck 7. At this time, the penetrameter 10 is already disposed on the truck 7 in a state placed on the penetrameter carrier 10. Now the truck 7 moves rightward to the operative position shown in solid lines in FIG. 2. The film cassette carrier 9 is closely attached to the inner wall of the steel pipe A and the penetrameter carrier 10 to its peripheral surface in a manner to clamp the welded portion of the forward end of the steel pipe A. The X-ray tube 6 is provided below the penetrameter carrier 10 so as to be vertically aligned with said carrier 10 and film cassette carrier 9. When set in place at the forward end of the steel pipe A, X-ray penetration device including the X-ray tube 6 is automatically operated to photograph the welded portion by X-rays. The condition of said X-ray photographing is previously determined by the X-ray control panel 5. When said photographing operation is brought to an end, the film cassette carrier 9 and penetrameter carrier 10 are removed from the wall of the steel pipe A and the truck 7 is brought back to its original inoperative position. The film cassette carrier 9, together with the film, is drawn backward into the control chamber 2. The control chamber operator takes out an exposed film.

When the welded portion of the forward end of the steel pipe A is fully examined, the turning roller assembly is actuated again to bring down the steel pipe A on the roller conveyor stands units 121 to 128 which in turn send the steel pipe A forward in the direction of the indicated arrow C through the examination chamber 1. Then the roller conveyor stands 131 to 138 on the pipe-forward side or the left side of FIG. 2 of the examination system is put into operation to transport the greater part of the steel pipe A further to the left side of the examination chamber 1.

Immediately before the steel pipe A reaches the position of the steel pipe B indicated in chain-dot lines in FIG. 2 the reduction gear 15 on the pipe-forwarding side is operated gradually to slow down the traveling speed of the steel pipe A finally to bring it to rest at the position of the steel pipe B. The welded portion of the rear end of the steel pipe A now taking the position of the steel pipe B is examined by another X-ray penetration device located on the left side of the examination chamber 1.

As in the preceding case of examining the welded portion of the forward end of the steel pipe, the pipe is lifted for rotation by the turning roller stands 191 to 194. After said rotation is stopped by the microswitch 20 acting as an automatic welded seam detector, the welded portion is photographed by the X-ray penetration device. When the welded portion of the rear end of the steel pipe is fully examined, the pipe is taken out of the examination system by the roller conveyor stands 131 to 138 on the pipe-forwarding side.

Steel pipes being examined are successively transported at a prescribed interval on both right and left roller conveyor lines. When the preceding steel pipe has the welded portion of its rear end examined at the position of the steel pipe B, the succeeding pipe is simultaneously brought to the position of the steel pipe A to have the welded portion of its forward end examined. This arrangement enables the examination chamber 1 to examine the welded portions of the forward and rear ends of two consecutive steel pipes at the same time. To this end the distance between these two steel pipes is previously so defined as to coincide with the distance between the X-ray penetration devices for examining the welded portion at the forward and rear ends of two consecutive steel pipes.

As mentioned above, the X-ray examination system of this invention can examine the welded portions of many steel pipes while they are transported by two roller conveyor lines, particularly those of the forward and rear ends of every two consecutive steel pipes simultaneously by a single step. Therefore, this invention carries out the X-ray examination of the welded portions of steel pipes quickly and accurately with a very high efficiency.

Further, the invention enables the transportation of a steel pipe and the setting of an X-ray penetration device to be controlled by a single operator operating the various control panels of the control chamber 2, offering the advantage of attaining the speedy and economical examination of a large number of steel pipes with great safely, namely without exposing the operator to any X-ray risk.

What we claim is:

1. An X-ray examination system for examining the welded portions at both ends of steel pipes by X-ray penetration and photographing which comprises an examination chamber provided with two X-ray penetration devices; a first roller conveyor line formed of a plurality of roller stands capable of jointly feeding a steel pipe being examined to the examination chamber and disposed on one side of the examination chamber; a first turning roller assembly comprising a plurality of turning roller stands provided at a suitable point between the respective roller stands of the first roller conveyor line in alignment with said roller stands so as to rotate a steel pipe in the circumferential direction; a first automatic welded seam detector for detecting the welded portion of the forward end of a steel pipe while being rotated by the first turning roller assembly and stopping the rotating steel pipe at a prescribed peripheral angle; a second roller conveyor line formed of a plurality of roller stands aligned with those of the first roller conveyor line, and disposed on the opposite side of the examination chamber so as to send further a steel pipe having the welded portion at its forward end already examined in the direction in which the steel pipe leaves the examination chamber; a second turning roller assembly comprising a plurality of turning roller stands each located at a suitable point between the respective roller stands of the second roller conveyor line in alignment with said roller stands so as to rotate a preceding steel pipe now brought to the opposite side of the examination chamber in the circumferential direction; a second automatic welded seam detector for detecting the welded portion of the rear end of the preceding steel pipe placed on said opposite side while the steel pipe is rotated by the second turning roller assembly so as to bring the rotating steel pipe to rest at a prescribed peripheral angle; and a control chamber annexed to the examination chamber for remote control so as to operate the first and second roller conveyor lines, attach one of the X-ray penetration devices of the examination chamber to the welded portion of the forward end of a succeeding steel pipe brought to the examination chamber by traveling on the first roller conveyor line and fit the order X-ray penetration device to the welded portion of the rear end of the preceding steel pipe already brought to the opposite side of the examination chamber.

2. An X-ray examination system according to claim 1 wherein the X-ray penetration device comprises a truck movable across the inoperative and operative positions, an X-ray tube placed on the truck, guide rails supported at one end by the truck and stretched out into the control chamber, a film cassette carrier slidable on the guide rails and an X-ray penetrameter carrier mounted on the truck; the film is loaded in the film cassette carrier in the control chamber and brought into the examination chamber by traveling on the guide rails; and when the truck is set in an operative position, the film cassette carrier loaded with the film and the penetrameter carrier on which the penetrameter is mounted are both attached to the welded portion at the end of a steel pipe.

3. An X-ray examination system according to claim 1 wherein those of the turning roller stands of the first and second turning roller assemblies which are disposed closest to both sides of the examination chamber respectively have the first and second automatic welded seam detectors mounted thereon.

4. An X-ray examination system according to claim 1 which further comprises a reduction gear for slowing down a steel pipe traveling on the roller conveyor line as the end of the pipe approaches the X-ray examination point in the examination chamber finally to stop the pipe at said point.

* * * * *

UNITED STATES PATENT OFFICE
CERTIFICATE OF CORRECTION

Patent No. 3,848,127　　　　　　　Dated November 12, 1974

Inventor(s) Seiji FUJII, Kumio MATSUI, and Shigeru SATO

It is certified that error appears in the above-identified patent and that said Letters Patent are hereby corrected as shown below:

The name of the second Assignee should be changed from "Seisakusko" to --Seisakusho--.

Column 6, line 46, before "X-ray" the word "order" should be changed to --other--.

Signed and sealed this 11th day of February 1975.

(SEAL)
Attest:

RUTH C. MASON
Attesting Officer

C. MARSHALL DANN
Commissioner of Patents
and Trademarks